United States Patent
Waterhouse et al.

(10) Patent No.: US 8,013,741 B2
(45) Date of Patent: Sep. 6, 2011

(54) EVIDENCE TRACKING

(75) Inventors: Paul Waterhouse, Selkirk (CA); John K. Stevens, Stratham, NH (US); Jason August, Toronto (CA); Jessica L. Olson, Erie, CO (US)

(73) Assignee: Visible Assets, Inc., Mississauga, Ontario (CA)

( * ) Notice: Subject to any disclaimer, the term of this patent is extended or adjusted under 35 U.S.C. 154(b) by 0 days.

(21) Appl. No.: 13/004,176

(22) Filed: Jan. 11, 2011

(65) Prior Publication Data
US 2011/0108321 A1    May 12, 2011

Related U.S. Application Data

(60) Continuation of application No. 12/249,639, filed on Oct. 10, 2008, which is a division of application No. 11/456,182, filed on Jul. 7, 2006, now Pat. No. 7,436,304.

(60) Provisional application No. 60/700,886, filed on Jul. 19, 2005, provisional application No. 60/806,748, filed on Jul. 7, 2006.

(51) Int. Cl.
    *G08B 13/14* (2006.01)
(52) U.S. Cl. ........... 340/572.1; 340/10.1; 340/539.13
(58) Field of Classification Search .......... 340/572.1, 340/573.3, 572.7, 539.13, 10.1, 10.2; 235/375, 235/385
See application file for complete search history.

(56) References Cited

U.S. PATENT DOCUMENTS

| | | | |
|---|---|---|---|
| 4,745,882 A * | 5/1988 | Yarnall et al. | 340/573.3 |
| 5,272,466 A * | 12/1993 | Venczel | 340/573.3 |
| 5,371,982 A * | 12/1994 | Douglas et al. | 52/64 |
| D362,797 S * | 10/1995 | Caracciolo | D8/359 |
| 5,781,704 A | 7/1998 | Rossmo | |
| 5,893,228 A * | 4/1999 | Rivera | 40/606.12 |
| 6,538,623 B1 | 3/2003 | Parnian et al. | |
| 6,750,769 B1 | 6/2004 | Smith | |
| 6,772,532 B1 * | 8/2004 | Honea | 33/759 |
| 6,816,075 B2 | 11/2004 | Grunes et al. | |
| 6,935,059 B1 * | 8/2005 | Chang | 40/607.02 |
| 6,992,582 B2 | 1/2006 | Hill et al. | |
| 7,013,619 B2 | 3/2006 | Hoover | |
| 7,049,963 B2 | 5/2006 | Waterhouse et al. | |
| 2001/0040508 A1 * | 11/2001 | Janning et al. | 340/573.3 |
| 2001/0045554 A1 * | 11/2001 | Pulliam | 256/65 |
| 2005/0008433 A1 * | 1/2005 | Dvoracek | 404/9 |
| 2005/0012619 A1 * | 1/2005 | Sato | 340/572.8 |
| 2006/0055559 A1 * | 3/2006 | Leonard | 340/908.1 |
| 2006/0130598 A1 * | 6/2006 | Driessche | 73/864.71 |
| 2007/0085681 A1 | 4/2007 | Sawyer | |

* cited by examiner

*Primary Examiner* — Eric M Blount
(74) *Attorney, Agent, or Firm* — Larson & Anderson, LLC

(57) ABSTRACT

A system uses a large loop antenna, connected with a transceiver operating below 1 MHz. The loop antenna is deployed from a spool to surround a crime scene, and may carry indicia communicating that it is a crime scene boundary. The system interrogates devices, including evidence bags and badged personnel, as they enter and leave the scene. The system can optionally log the time of salient events. A second loop antenna can log evidence bags as they enter a vehicle. The devices can be silenced by the transceiver and thus collisions can be reduced and avoided among responses from devices. The system performs "area reads" that would not be possible if higher RF frequencies were employed.

3 Claims, 1 Drawing Sheet

“EVIDENCE TRACKING”

CROSS-REFERENCE TO RELATED APPLICATIONS

This application claims priority from U.S. application Ser. No. 60/700,886 filed Jul. 19, 2005, and from U.S. application Ser. No. 60/806,748 filed Jul. 7, 2006, each of which is incorporated herein by reference for all purposes.

BACKGROUND

It is not easy to keep track of evidence in a crime scene investigation. It is necessary for each piece of evidence to maintain a "chain of custody" so that the authenticity of a piece of evidence at trial can be known. At many crime scenes it is also necessary to maintain a log of the personnel entering and leaving the crime scene. The procedures required to maintain the chain of custody and the crime scene log are detail-oriented and if errors are made it can be a big problem later.

It has been proposed to use RFID tags, for example, to try to keep track of evidence and to assist in logging entry and exit of personnel from areas. Most RFID tag designs are not very workable for these purposes, as they are little more than high-tech bar codes that can only be read by a reader such as a handheld "gun" that is placed into close physical proximity with a tag to read the tag. At most crime scenes it is unworkable to try to use close-proximity readers, whether bar-code or RFID. One cannot, for example, count on a person who is entering or exiting a crime scene to do so at a location where such a close-proximity reader is located. Through inadvertence or otherwise, an evidence bag might enter or exit a crime scene boundary at any point along the boundary.

It would be very desirable if a system and method could be devised that would facilitate RF tracking of salient events at a crime scene, that would detect entry and exit at all points along a boundary, and that would more or less continually keep track of who is in the crime scene.

SUMMARY OF THE INVENTION

A system uses a large loop antenna, connected with a transceiver operating below 1 MHz. The loop antenna is deployed from a spool to surround a crime scene, and may carry indicia communicating that it is a crime scene boundary. The system interrogates devices, including evidence bags and badged personnel, as they enter and leave the scene. The system can optionally log the time of salient events. A second loop antenna can log evidence bags as they enter a vehicle. The devices can be silenced by the transceiver and thus collisions can be reduced and avoided among responses from devices. The system performs "area reads" that would not be possible if higher RF frequencies were employed.

DETAILED DESCRIPTION

Figure 1:
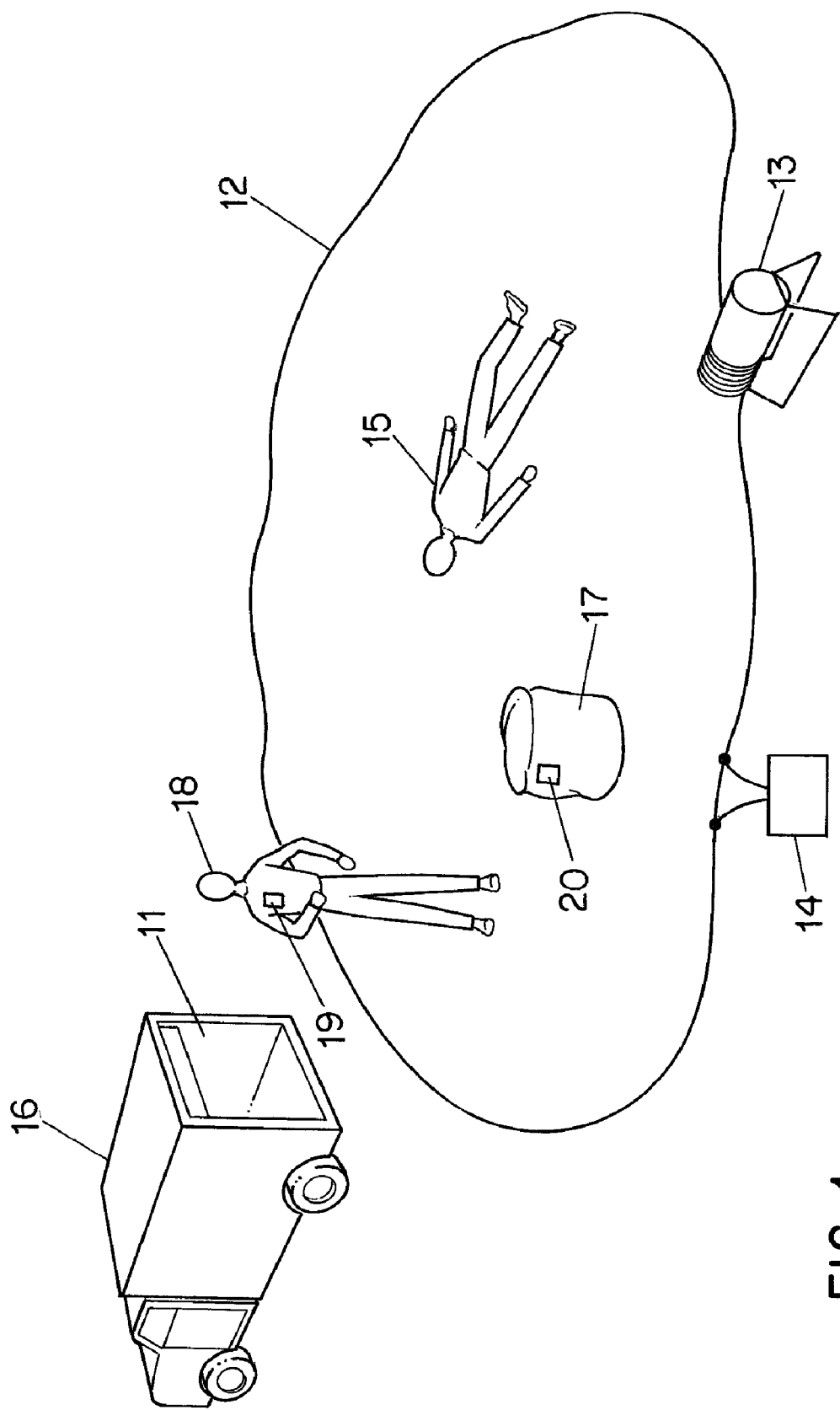
FIG. 1 shows a typical deployment of the system according to the invention.

Turning to FIG. 1, what is shown is a typical deployment of the system according to the invention. A truck or other motor vehicle 16 arrives at a crime scene defined by corpse 15. A spool 13 is removed from the truck and is placed at a position that lies on a desired crime scene boundary. An electrically conductive line 12 is unspooled from the spool 13 and is laid out along the surface of the ground along the desired crime scene boundary, returning to the start to define a complete boundary. The line is connected to a transceiver 14 about which more will be said later. The transceiver 14 is optionally equipped with a GPRS, Edge, EVDO, WiFi, or other WAN interface permitting reporting of events to distant equipment omitted for clarity in FIG. 1.

Personnel 18 wears a badge 19, containing a radio tag. The radio tags employed can, for example, be tags such as those described in U.S. Pat. No. 7,049,963 entitled "Networked RF tag for tracking freight" and assigned to the same assignee as the present invention, which patent is incorporated herein by reference.

The transceiver 14 can, for example, be a transceiver such as that described in copending U.S. application Ser. No. 60/806,520, filed Jul. 3, 2006 and assigned to the same assignee as the present invention, which application is incorporated herein by reference. The transceiver can transmit at, say, a predetermined multiple of 32768 Hertz (the standard watch crystal frequency) such as 65 kHz or 133 kHz. The transceiver may have switchable antenna terminals to handle as many as four distinct antennae. The transceiver can switch from one antenna to the next, and even if one antenna is not well coupled with a particular tag, very likely one of the other two antennas will turn out to be well coupled with that particular tag.

The typical steps of deployment, as mentioned above, call for a line at least twenty feet in length. Each tag, whether on an evidence bag or on a badge, has a respective identifier and is disposed to receive queries at a radio frequency no greater than 1 MHz and to emit responses thereto at a radio frequency no greater than 1 MHz. In the case of an evidence bag, there is a tag mechanically affixed to the bag. The bag has an opening and a closure for the opening.

A first responder at the crime scene will define a first scene of interest having a perimeter, the scene of interest having an area, the area exceeding twenty-five square feet, the perimeter extending at least twenty feet. The conductive line is deployed starting with its first end at a first point at the perimeter, along the perimeter around the first scene of interest, and returning with its second end to the first point. A first apparatus (the transceiver 14) is connected a the first and second ends of the line. The apparatus operates at a radio frequency no greater than 1 MHz.

The first apparatus is operated to emit a query. It is operated to listen for a response to the query from a tag. In the event of a response, an identifier is extracted an identifier, and the identifier is stored in the first apparatus and/or is communicated via a WAN link to other equipment. A silence request is transmitted with respect to the identifier.

The emitting, listening, extracting, storing, and transmitting steps, are repeated, thereby accumulating a list of identifiers. The system makes note of times at which the list changes, thereby detecting events of tags and/or badges entering and leaving the first scene of interest.

Later when the crime scene is cleared, the line is removed and respooled. Still later, the spool is redeployed to a second crime scene elsewhere.

The line may be laid upon the ground, or may be suspended from posts or vegetation or otherwise deployed at waist or chest height.

Evidence bags can optionally each have a button that permits the tag to respond differently due to the pressing of the button, in which case in the event of a response that is different due to the pressing of a button, what is stored additionally includes information thereof, thereby detecting events of the pressing of a button on a tag. The button might mean that the bag has been put into use.

The evidence bags may each have a motion sensor which, when triggered, causes the tag to respond differently due to sensed motion, in which case in the event of a response that is different due to sensed motion, what is stored additionally includes information thereof, thereby detecting events of motion of an evidence bag.

The procedure for use of a bag may include such steps as placing a first item in a bag affixed to a first tag; closing the closure of the bag affixed to the first tag; placing a second item in a bag affixed to a second tag; closing the closure of the bag affixed to the second tag; removing the first tag and the second tag, and their respective bags, from the enclosure; and detecting the events of the first and second tags leaving the scene of interest.

Badges may also be used. A badge may have a respective identifier and disposed to receive queries at a radio frequency no greater than 1 MHz and to emit responses thereto at a radio frequency no greater than 1 MHz, in which case the step of making note of times at which the list changes further detects events of badges entering and leaving the first scene of interest.

The evidence bags may optionally each have a sensor sensing a closed condition of the closure, the sensor causing the tag to respond differently due to the closed condition, in which case in the event of a response that is different due to the closed condition, what is stored additionally includes information thereof, thereby detecting events of the closure being opened or closed on the bag of a tag.

The conductive line may comprises a tape bearing printed indicia visible from a distance, for example the words "CRIME SCENE".

It will be appreciated that this system can detect entry and exit of evidence bags and of badges from any direction. There is not a need to enter and exit at a particular point along the boundary.

Those skilled in the art will have no difficulty devising myriad obvious variations and improvements of the invention, all of which are intended to be encompassed within the claims which follow.

The invention claimed is:

1. A combination of an electrically conductive line, and a transceiver operating at a frequency of less than 1 MHZ,
   wherein the electrically conductive line comprises a tape bearing printed indicia visible from a distance, the indicia comprising the words "CRIME SCENE", the line being at least 20 feet in length, and
   wherein the conductive line is connected to the transceiver as an antenna.

2. The combination of claim 1, wherein the transceiver operates at a frequency of 133 kHz.

3. The combination of claim 1, wherein the transceiver operates at a frequency of 65 KHz.

\* \* \* \* \*